July 23, 1935.    F. A. BYLES    2,009,103
ELECTRICAL REGULATING SYSTEM
Filed Oct. 28, 1932
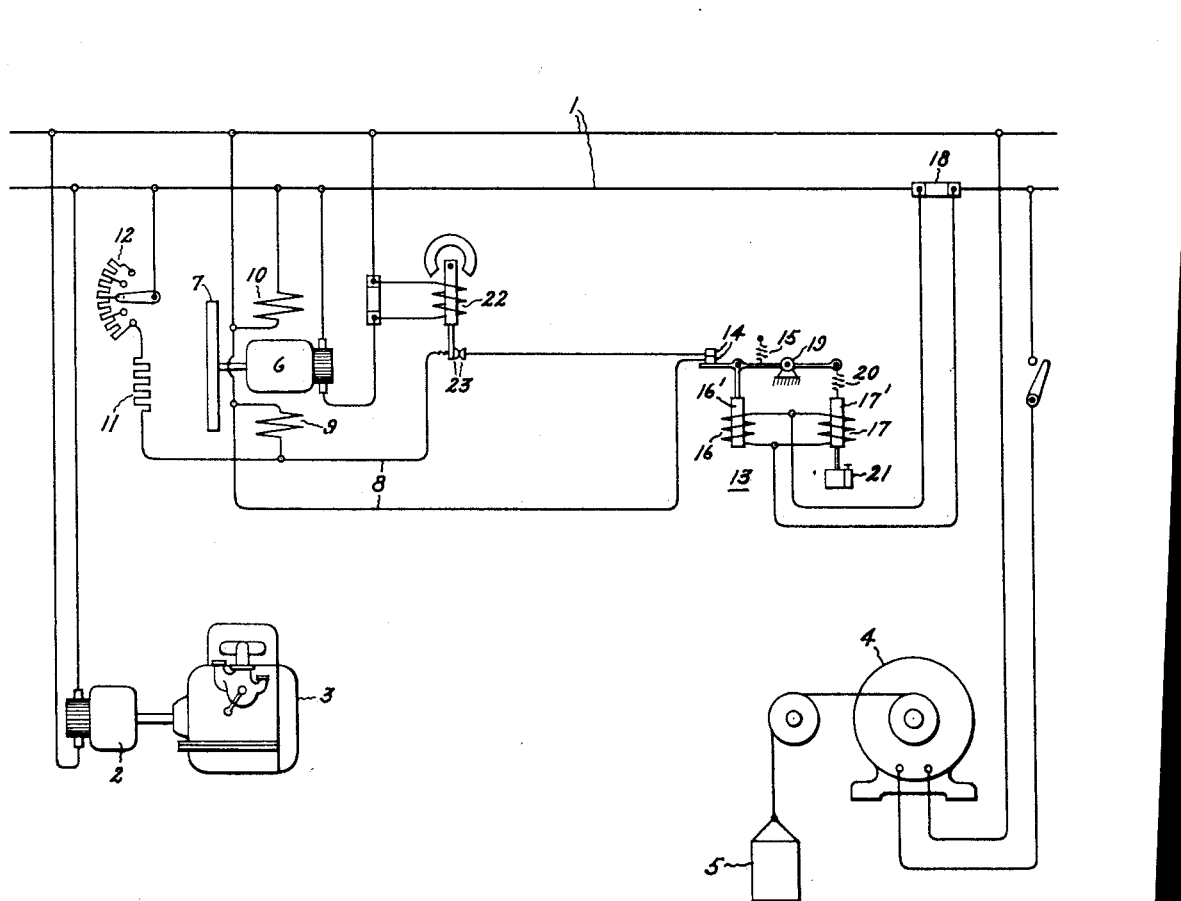
Inventor:
Frank A. Byles,
by Charles E. Tullar
His Attorney.

Patented July 23, 1935

2,009,103

UNITED STATES PATENT OFFICE 2,009,103

ELECTRICAL REGULATING SYSTEM

Frank A. Byles, Scotia, N. Y., assignor to General Electric Company, a corporation of New York Application October 28, 1932, Serial No. 640,039

7 Claims. (Cl. 172—239)

My invention relates to electrical regulating systems and more particularly to electrical regulating systems for dynamo electric machines.

Dynamo electric machines, as elements of flywheel sets or balancer sets, are often connected to variable load electric circuits. Such sets usually comprise a flywheel mechanically connected to a dynamo electric machine which acts sometimes as a motor and sometimes as a generator. These sets operate to store energy in the flywheel under light load conditions on the variable load circuit and to give up the energy thus stored to the circuit under peak load conditions. In this manner the load on the main generator, or generators, of the circuit is equalized in that sudden peak loads will be carried by the flywheel set. This is particularly advantageous in cases where the main generator is driven by an oil engine because it has been found that when sudden loads are applied to such engines large amounts of fuel injected into the cylinders are not properly fired and cause bad carbonization.

In accordance with my invention I provide a novel and improved regulating system for flywheel sets. Regulation is achieved through control of the dynamo electric machine of such sets. This regulation is preferably such as to increase automatically the output of the dynamo electric machine, as a generator, when the rate of effective load increase on the main circuit is above a predetermined value and to limit automatically the input to the dynamo electric machine, as a motor, to a predetermined maximum value.

An object of my invention is to provide a new and improved electrical regulating system.

Another object of my invention is to provide an automatic regulating system for flywheel sets which automatically increases the output of such sets in response to the rate of increase of the effective value of load on a main circuit.

A further object of my invention is to provide a regulating system for flywheel sets which increases their output in response to the rate of change of the effective value of load on the main circuit and which limits their input to a predetermined maximum value.

My invention will be better understood from the following description taken in connection with the accompanying drawing and its scope will be pointed out in the appended claims.

Referring now to the single figure of the accompanying drawing, I have illustrated diagrammatically a preferred embodiment of my invention as applied to a variable load direct current circuit 1 which is energized by a main generator 2. Generator 2 is connected to be driven by an engine 3, such as a Diesel engine. Connected to produce relatively sudden peak loads on circuit 1 is a load device which may take any one of a number of equivalent forms and which is illustrated as a motor 4 for operating an elevator 5.

A flywheel set comprising a dynamo electric machine 6 and a flywheel 7 is connected to circuit 1 for the purpose of aiding generator 2 in carrying peak loads applied to this circuit. For controlling the voltage of machine 6 and consequently for controlling its motoring or generating action I provide an excitation controlling circuit 8. This circuit may control the excitation of machine 6 in any one of a wide variety of equivalent ways and, as shown, I have arranged this circuit to control the short circuiting of an auxiliary field winding 9 which is cumulative with respect to a main field winding 10 for machine 6. As shown, winding 10 is connected directly across circuit 1 while auxiliary winding 9 is connected across the circuit through a suitable current limiting resistor 11 and a suitable adjustable resistor 12.

For controlling the excitation controlling circuit 8 in accordance with the rate of change of the effective value of load on circuit 1, I provide a surge responsive circuit controller which may be of any desired type and which I have illustrated, by way of example, as a surge responsive relay 13. This relay consists of a pair of normally closed contacts 14, which are biased to their closed position by a spring 15 and whose opening is controlled by a pair of parallel connected windings 16 and 17. These windings are connected to respond to the load on circuit 1 in any well known manner. As it will be assumed that circuit 1 is substantially a constant voltage circuit, windings 16 and 17 are made responsive to the current flow which, under the assumed condition, is an indication of the load on the circuit. This is done by connecting these windings across a suitable current limiting shunt 18. Windings 16 and 17 have cores 16' and 17' which are arranged to exert equal and opposite pulls on a pivoted arm 19 which carries one of the contacts 14. Core 16' produces a direct pull on this arm while core 17' is arranged to produce a pull on this arm through a resilient connection, or spring, 20 and the motion of core 17' is also damped by means of any suitable means, such as a dashpot 21. With such an arrangement the contacts 14 will be closed whenever the current flow in circuit 1 is substantially steady because under such circumstances the pulls of the cores 16' and 17' will be equal and opposite with respect to the arm 19. However, if the current flow in circuit 1 increases rapidly enough the pull of core 16' on arm 19 will overbalance the pull of core 17' on this arm because the damping action of dashpot 21 will retard the movement of the core 17' which is necessary in order that the tension in spring 20 be equal to the pull of core 16'. Consequently the contacts 14 will open whenever the current in circuit 1 increases at a rate which is greater than a predetermined value, which value is dependent upon the tension of spring 15 and the setting of dashpot 21.

For controlling the excitation of machine 6 in response to its input, when it is acting as a motor, I provide any suitable means such, for example, as a polarized relay 22 having a pair of normally closed contacts 23 connected in circuit 8. This relay is arranged to open its contacts 23 when the motoring current from circuit 1 to the motor 6 exceeds a predetermined maximum value.

The operation of the illustrated embodiment of my invention is as follows. Assume that engine 3 is driving generator 2 in a normal manner and that the load on circuit 1 is substantially steady, that is to say, assume that motor 4 is idle. Under these circumstances contacts 14 and 23 will be closed thereby closing circuit 8 to short circuit the field winding 9. Consequently machine 6 will have minimum excitation and it will be rotating at a relatively high speed due to this relatively low excitation. Assume now that a relatively sudden peak load is applied to circuit 1 as for example by the connection of motor 4 to circuit 1. Under these circumstances contacts 14 of relay 13 will open thereby causing field winding 9 to add its excitation to that produced by field winding 10 and consequently increasing the excitation and the voltage of machine 6. Consequently machine 6 will act as a generator to send power into circuit 1 and this will cause the total peak load to be divided between machines 2 and 6 and consequently machine 2 will not be overloaded. During this operation the energy which has been stored in flywheel 7 due to its relatively rapid rotation will be converted into electrical energy by the machine 6 and consumed by the load 4. However, as peak loads are usually only transitory in character the energy storage capacity of flywheel 7 may be made large enough to take care of such peak loads.

Assume now that the load current in circuit 1 again returns to a substantially steady value. Under these circumstances contact 14 of relay 13 will again close and the excitation of machine 6 will be reduced. Consequently this machine will draw current from circuit 1 and will act as a motor. Due to the fact that considerable energy has been taken from flywheel 7 and its speed has been considerably reduced it will take considerable energy to bring it up to speed again and consequently there is likelihood of overloading machine 6 as a motor in attempting to too rapidly accelerate the flywheel. If, however, the motoring current exceeds a predetermined safe value for machine 6 the contacts 23 of relay 22 will open thereby increasing the excitation of machine 6 which, of course, will also increase its voltage and thereby decrease the current drawn from circuit 1. This action will continue until the machine 6 is again up to normal speed and the contacts 23 remain closed.

While I have shown and described a particular embodiment of my invention, it is obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States:

1. In combination, a dynamo-electric machine, an auxiliary dynamo-electric machine, a common circuit to which said machines are connected in parallel, and means responsive to the rate of change of the effective value of an electrical condition of said circuit for varying an electrical condition of said auxiliary machine.

2. In combination, a main generator, an auxiliary dynamo-electric machine, a common load circuit to which said machines are connected in parallel, and means responsive to the rate of change of the effective value of load on said common circuit for varying the excitation of said auxiliary machine.

3. In combination, a variable load circuit, a flywheel set connected thereto, and means responsive to the rate of change of the effective value of load on said circuit for controlling the power interchange between said circuit and said set when said rate of change has a predetermined value.

4. In combination, a variable load circuit, a flywheel set connected to said circuit, and means responsive to a predetermined rate of increase of the effective value of load on said circuit for increasing the power supplied by said set to said circuit.

5. In combination, a variable load electric circuit, a flywheel set connected thereto, means responsive to the rate of increase of the effective value of load on said circuit for increasing the output of said set when the rate of increase of load on said circuit exceeds a predetermined high value, and means responsive to the input to said set from said circuit for limiting said input to a predetermined maximum value.

6. In combination, a variable load circuit, a flywheel set connected to said circuit, a circuit for controlling the excitation of said set, a relay responsive to the rate of change of the effective value of load on said load circuit for making and breaking said excitation controlling circuit, and a relay responsive to the magnitude of the motoring current of said set for making and breaking said excitation controlling circuit.

7. In combination, a direct current electric power circuit, an internal combustion engine driven direct current generator connected to said circuit, a direct current elevator motor connected to said circuit, a direct current dynamo electric machine connected to said circuit, a flywheel for said machine, an excitation controlling circuit for said machine, said excitation controlling circuit being arranged to increase the excitation of said machine when it is opened, two sets of normally closed contacts connected in series in said excitation controlling circuit, means responsive to a predetermined rate of increase of current in said power circuit for opening one of said sets of contacts, and means responsive to a predetermined high value of current taken from said power circuit by said machine for opening the other set of contacts.

FRANK A. BYLES.